Patented Jan. 22, 1929.

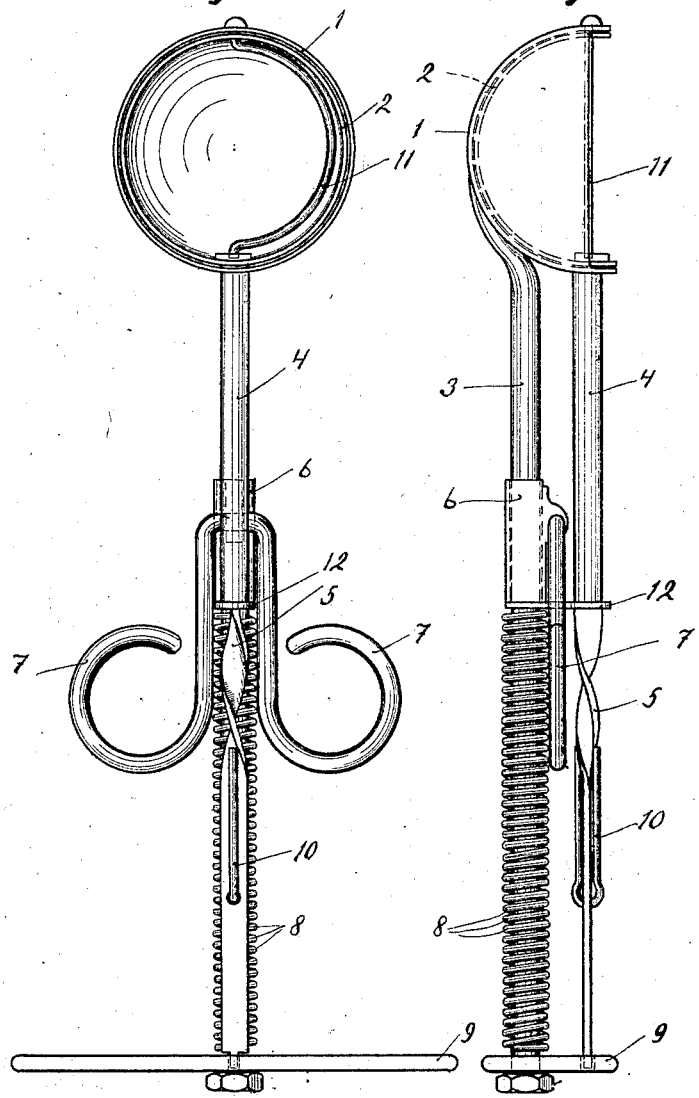

1,699,914

UNITED STATES PATENT OFFICE.

PER ANDERS JULIARD PERSSON, OF VANNAS, SWEDEN.

APPARATUS FOR THE PRODUCTION OF FORCE-MEAT BALLS AND THE LIKE.

Application filed July 18, 1927, Serial No. 206,674, and in Sweden July 16, 1926.

This invention relates to a device to be used in the formation of meat balls and the like, and has for its object to provide a device of this character of simple and compact construction employing a minimum number of parts and with which bodies of uniform shape and size may be formed from a mass of material.

In the accompanying drawing wherein an approved embodiment of the invention is illustrated, Fig. 1 is a plan view of the device and Fig. 2 is a side elevation thereof.

Referring to the drawing in detail the device consists of substantially semi-spherical cup-shaped members 1 and 2 normally occupying positions one within the other, the member 2 being movable through an angle of 180° from the position shown in the drawing so as to form, in connection with the member 1, a substantially spherical form of mould. The outer member 2 is rigidly secured to one end of a handle bar 3 to the opposite end of which the handle 9 is fixed.

The shank 4 is fixed to the inner cup member 2, passes through the outer cup member 1 and is journalled for rotary movement in the latter. The opposite extremity of the shank 4 is flattened and twisted as at 5. A sleeve 6 is slidably mounted on the handle bar 3 and carries a handle 7 preferably provided with two looped portions 7 lying at opposite sides of the twisted portion of the shaft, and in such relation to the handle 9 as to be conveniently gripped by the fingers of the operator. The sleeve 6 is provided with a lateral extension 12 formed with the slot receiving the flat twisted portion 5 of the shaft whereby incident to sliding movement of the sleeve rotary motion is imparted to the shaft.

The stop 10 is fastened to the flattened portion 5 of the shaft for engagement by the lateral extension 12 whereby sliding movement of the sleeve 6 in the direction of the handle 9 is limited. A spring 8 is coiled about the bar 3, and being confined between the handle 9 and the sleeve 6 normally tends to displace the latter in the direction of the member 1 whereby to normally maintain the member 2 in position within the member 1.

A wire or like member 11 shaped in conformity with and lying in close proximity to the inner member 2 is fastened at 11ª to the outer member 1, passing through the member 2. The purpose of the wire 11 is to act as a scraper or ejector to prevent adhesion of the material to the wall of the member 2 when the latter is returned to its initial position as shown in the drawing. In use the device is grasped around the handles 9 and 7 and the cup-shaped members located one within the other are introduced into the material, and thereafter the handle 7 is drawn toward the handle 9 causing rotary movement of the shaft 4 and the corresponding movement of the inner member 2 thereby scooping a ball-shaped body of the material from the mass thereof. Upon release of the handle 7 the shaft 4 is returned by the spring 8 and the inner member 2 in returning to its position within the member 1 detaches from the wall of the latter such material as might adhere thereto, while the curved wire 11 lying closely against the inner surface of the inner member 2 effectively loosens the body of material from the inner surface of the inner member, and thus said body is entirely loosened and may freely fall from the cup members.

Having now described my invention, what I claim as new and desire to secure by Letters Patent is:

1. A device of the character described, including two substantially cup-shaped members normally lying one within the other, said members being pivotally connected and movable to positions providing a closed form, means for effecting displacement of the inner member relative to the outer member, the inner member acting during its return movement into the outer member to scrape material from the inner surface of the outer member, and a scraping member associated with the inner member and arranged to remove material therefrom during the return movement of said inner member.

2. A device of the character described, including two substantially cup-shaped members normally lying one within the other, said members being pivotally connected and movable to positions providing a closed form, means for effecting displacement of the inner member relative to the outer member, the inner member acting during its return movement into the outer member to scrape material from the inner surface of the outer member, and a scraping member associated with the inner member and arranged to remove material therefrom during the return movement of said inner member, said means for effecting relative movement of the members including a shaft connected with the inner member, a bar carried by the outer member, a screw carried by said shaft, and means slidably mounted on said bar and coacting with said screw to turn said shaft.

In witness whereof, I have hereunto signed my name.

PER ANDERS JULIARD PERSSON.